B. WEXLER.

ELEVATOR SHAFT DOOR.

APPLICATION FILED DEC. 13, 1917.

Reissued Apr. 15, 1919.

14,637.

2 SHEETS—SHEET 1.

Benjamin Wexler INVENTOR

Frank T. Wentworth ATTORNEY

B. WEXLER.

ELEVATOR SHAFT DOOR.

APPLICATION FILED DEC. 13, 1917.

Reissued Apr. 15, 1919.

14,637.

2 SHEETS—SHEET 2.

Benjamin Wexler INVENTOR

BY Frank T. Wentworth his ATTORNEY.

UNITED STATES PATENT OFFICE.

BENJAMIN WEXLER, OF BROOKLYN, NEW YORK, ASSIGNOR TO THE PEELLE COMPANY, OF BROOKLYN, NEW YORK, A CORPORATION OF NEW YORK.

ELEVATOR-SHAFT DOOR.

14,637. Specification of Reissued Letters Patent. Reissued Apr. 15, 1919.

Original No. 1,179,883, dated April 18, 1916, Serial No. 37,474, filed July 1, 1915. Application for reissue filed December 13, 1917. Serial No. 207,016.

*To all whom it may concern:*

Be it known that I, BENJAMIN WEXLER, a citizen of the United States, and a resident of New York city, borough of Brooklyn, in the county of Kings and State of New York, have invented certain new and useful Improvements in Elevator-Shaft Doors, of which the following is a specification.

This invention relates to certain new and useful improvements in doors for elevator shafts and particularly to fire proof doors and to doors which move vertically and are suspended in the shaft at the door openings and which doors are generally connected by chains passing over a pulley so that one door counterbalances the other or assists in opening or closing it.

The object of my invention is to provide one or more guides for these doors between the side edges of the doors so that the doors are not merely held to the wall by the side edge guides, as customary, but whether opened, closed or partly opened, they are at all times held to the wall and cannot be forced away from the same, which additional track holds the door close to the wall at points between the side edges, forms a support for the lower door when lowered to prevent any strain whatever on the chains, by passing trucks and which improvement further completely closes all gaps, so that there is no possibility of the passage of flame and smoke in appreciable quantities from the elevator shaft to the rooms or from the rooms to the shaft at the sill and lintel of the door opening when the doors are closed, all of which is very simple in construction, strong and durable and not apt to get out of order.

In the accompanying drawings in which like letters of reference indicate like parts in all the figures.

The doors are made of corrugated iron with iron frames. They are hung as usual from the opposite ends of chains passed over pulleys so that when one door is raised, the other is lowered and vice versa. This hanging construction is well known and forms no part of the present invention and therefore need not be described.

Figure 4:
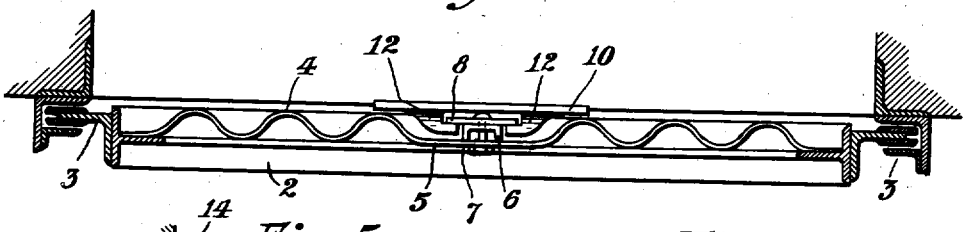
Fig. 4 is an enlarged horizontal sectional view of the complete door and the additional guide, parts being broken away.

The doors 1 have a frame composed of top, bottom and side members made of T-iron of suitable size. The usual and conventional guide rails indicated at 3 along the side edges of the door opening are provided in the usual manner and they likewise form no part of the present invention. Corrugated sheet iron 4, the corrugations of which are preferably arranged vertically, is riveted or secured by bolts to the webs of the T-irons 2 of the door frame. In the center of the door, between the side edges, the corrugations are flattened out so as to form a plane or flat surface 5 as shown in Fig. 4, which flat surface extends from the top to the bottom bar of the frame. A guide rail 6 is attached at said flattened part 5, to the door, on that side of the door facing the wall of the shaft. This guide rail preferably consists of a channel bar 7, the edges of the flanges of said channel bar resting on the flattened part 5 of the corrugated iron and on the closed side of this channel bar a plate 8 is secured. The channel bar 7 and the plate 8 may be rolled integral of metal if desired. Screws or rivets 9 are passed through the ends of said guide rail 6, through the flattened parts 5 of the corrugations, into the webs of the T-irons 2 at the top and bottom of the door.

Figure 1:
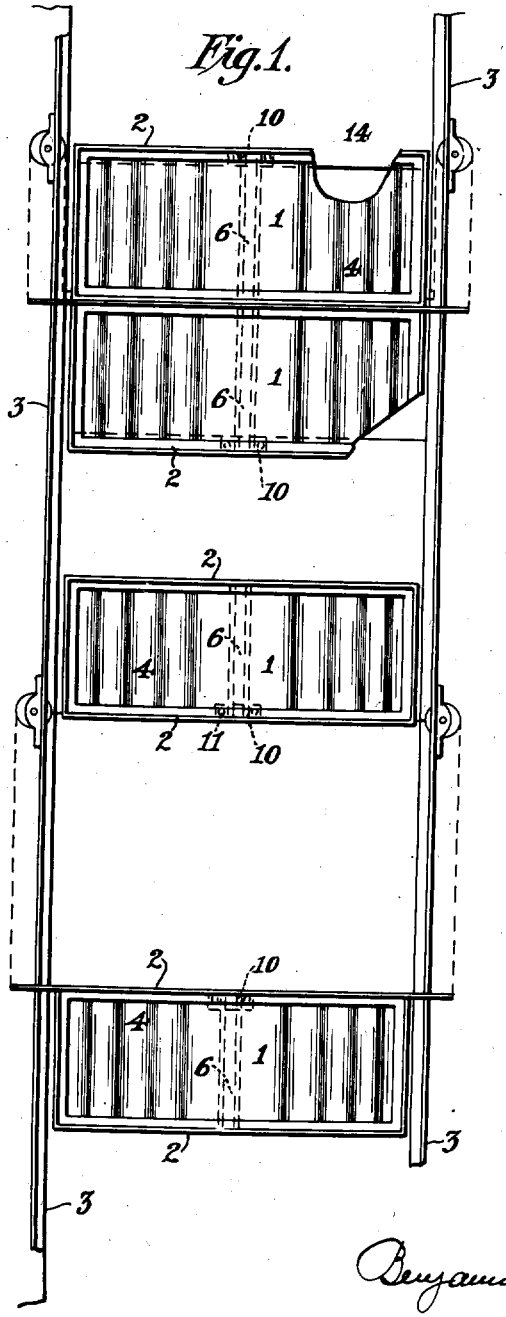
Figure 1 is a diagram view of part of an elevator shaft provided with two openings, one above the other, the doors being provided with one embodiment of my improvement, herein described.
Figure 2:
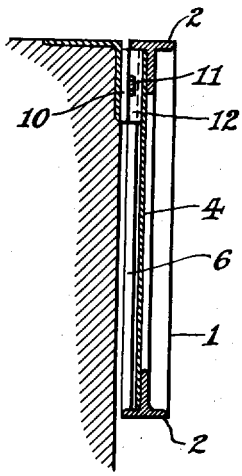
Fig. 2 is a vertical transverse sectional view through the bottom door, showing its relation to the sill when lowered.
Figure 5:
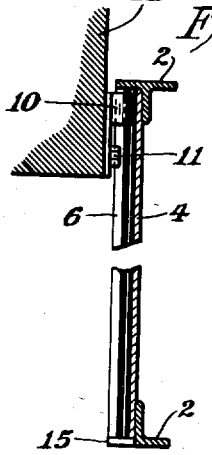
Fig. 5 is a vertical transverse section through the top door, parts being broken away.
Figure 6:
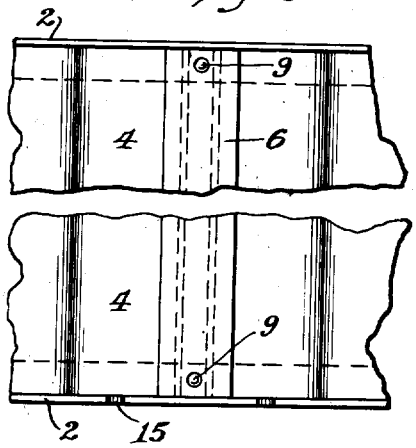
Fig. 6 is an elevation of the same, parts being broken away.

A shoe 10 is fastened by bolts 11 to the elevator shaft wall, directly below the sill and directly above the lintel as indicated in Fig. 1. This shoe has under cut brackets 12 projecting from its outer face at the upper edges so as to receive the guide rail 5 on the door as shown in Fig. 4. The shoe 10 is provided with horizontal slots 13 through which the bolts 11 are passed so as to permit of adjusting the shoe in the correct position. So as to permit of engaging the shoe and the guide rail 6 of the lower door, the bottom T-iron of the frame is provided in that flange which faces the shaft wall 14 with a recess 15 shown in Figs. 5, 6 and 7. This recess permits the bottom edge of the lower door to pass the shoe held directly below the sill as shown in Fig. 2 and then as the door is lowered, the shoe can engage the flanged guide rail 6. As the door is moved up or down, the guide rail 6 moves vertically through the shoe and is never disengaged from the same for the reason that the lower door when raised to close the door opening is not raised so far as to disengage the guide rail from the shoe 10 below the sill. The upper door is provided with a recess 15 in the upper frame member so that the upper shoe, which is located at the lintel, can be engaged with the guide rail 6 of the upper door, simply by moving the door upward and the guide rail 6 of the upper door will at all times remain in engagement with the shoe 10 at the lintel, whether the door is opened, closed or partly opened. The lower shoe 10 at the sill prevents the lower door from dropping in case the chains break, as the flanges of the top T-bar of the frame rest upon the brackets 12 of the shoe when the door is lowered and thus these brackets of the shoe form a support for the lower door to prevent sagging of the door at the middle when heavy trucks are passed over the same and as stated it absolutely prevents the lower door from dropping. The upper door however could drop in case of breaking of the chains as the upper T-bar of the frame is recessed in the same manner as the T-iron of the bottom member of the lower door is recessed as at 15.

To prevent the upper door from dropping a metal bar 16 is placed over the recess in the flange of the upper member of the upper door and this plate is preferably held in place by tap screws 17 and nuts 18. This plate is only applied on said upper member of the frame of the upper door after the guide rail 6 of the upper door has been engaged with the shoe at the lintel. If now, the chains break, the upper door cannot descend any farther than to closed position and cannot drop all the way down the elevator shaft as it is held by said plate 16. The additional guide rail 6 prevents forcing the doors inward toward the elevator shaft as the flanges or projecting edges of the guide rail 6 are engaged with the undercut brackets 12 of the shoes, which prevent all horizontal transverse motion of the door and always hold the doors close to the wall.

Figure 7:
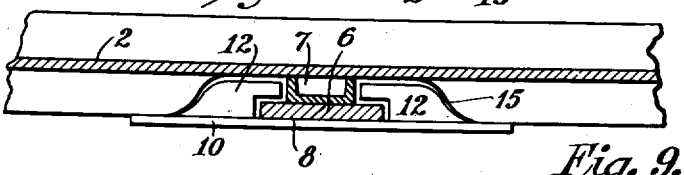
Fig. 7 is a horizontal sectional view through the lower door at the lower horizontal member.
Figure 8:
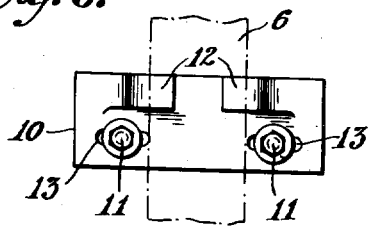
Fig. 8 is a face view of the shoe.
Figure 10:
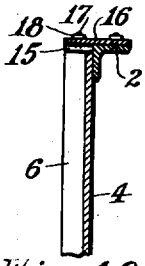
Fig. 10 is a vertical section of the same, parts being broken away.
Figure 9:
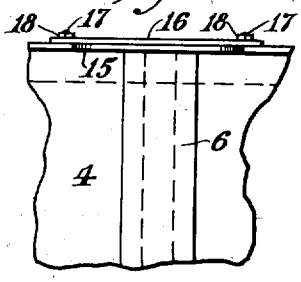
Fig. 9 is an elevation of the upper door, parts being broken away.

The shoe 10 and its undercut brackets completely close the recess 15 in the flange of the bottom member of the lower door when said door is raised as indicated in dotted lines in Fig. 7 and thus close the opening through which any flame or smoke could pass. In the same manner the shoe of the upper door closes the recess 15 in the flange of the upper member of the upper door when said door is closed and also prevents the passage of smoke and flame.

Figure 3:
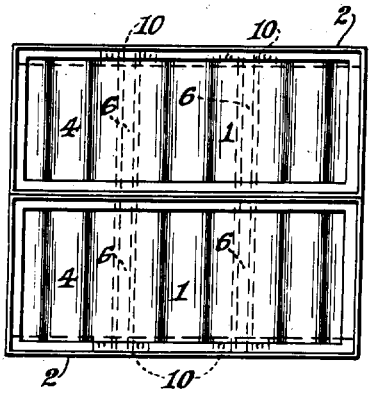
Fig. 3 is a diagrammatic view of the door provided with two guides.

As shown in Fig. 3 I may provide more than one additional guide rail 6 for doors of considerable horizontal dimensions between the side edges, said guide rails and shoes being constructed in the same manner as described.

The guide member or members 6, of each door section will strengthen and stiffen the door section and rigidly connect the upper and lower member of each door section, independently of the connection produced by the corrugated iron. This is of especial importance in the lower door section which is subjected to very severe compression strains when loads pass over the upper member of the same from the elevator car to the building floor, and vice versa, especially when the wheels of the truck meet the top members of the lower door section at opposite sides of such guide member or members 6.

Having described my invention what I claim as new and desire to secure by Letters Patent is:

1. An elevator shaft door embodying therein a vertically and downwardly movable door section comprising a metal frame having flanges having a metal sheet secured thereto, and other flanges projecting toward and substantially closing the gap between said sheet and the wall of the elevator shaft, guides upon opposite sides of the door section, and a vertically extending guide rail intermediate the sides of the door, within and extending from the top to the bottom flanges of said frame projecting toward the wall of the elevator shaft, guide rails with which the guides upon said door section respectively coöperate, and a shoe secured to the wall of the elevator shaft, adjacent the sill of the door opening coöperating with said intermediate guide rail, whereby when the door section is lowered, said shoe supports it intermediate the sides thereof and said intermediate guide rail stiffens the door section, and by engagement with said shoe holds the door at all times close to the wall of the elevator shaft.

2. An elevator shaft door embodying therein two door sections mounted to slide vertically from and toward each other, one section being adapted to move to the sill of a door opening, and the other to move to the lintel of said opening, guide rails for said door sections, said sections each comprising a flanged metal frame having flanges having a metal sheet secured thereto and other flanges projecting toward and substantially closing the gap between said sheet and the wall of the elevator shaft, guides at opposite sides thereof coöperating with said guide rails and a vertically extending guide rail intermediate the sides of the door, within and extending from the top to the bottom flanges of the door frame projecting toward the wall of the elevator shaft, and shoes adjacent the lintel and the sill, of the door opening coöperating with the intermediate guide rails of the upper, and the lower door sections respectively, whereby when the door sections are moved to the lintel and sill of the door opening respectively, said shoe adjacent the sill supports it intermediate the sides thereof, and said intermediate guide rails stiffen their respective door sections, and by engagement with the shoe coöperating therewith holds both door sections at all times close to the wall of the elevator shaft.

In witness whereof, I hereunto affix my signature, in the presence of two subscribing witnesses, this 10th day of December, 1917.

BENJAMIN WEXLER.

Witnesses:
T. T. WENTWORTH,
BERTHA MUELLER.